US007878857B2

(12) United States Patent
Chien

(10) Patent No.: US 7,878,857 B2
(45) Date of Patent: Feb. 1, 2011

(54) ELELCTRICAL CONNECTOR WITH NOTCH FOR RECEIVING MATING COMPONET

(75) Inventor: Cheng-Ching Chien, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/622,449

(22) Filed: Nov. 20, 2009

(65) Prior Publication Data
US 2010/0290742 A1 Nov. 18, 2010

(30) Foreign Application Priority Data
May 12, 2009 (TW) .................. 98208106

(51) Int. Cl.
*H01R 24/00* (2006.01)
(52) U.S. Cl. ...................................... 439/630
(58) Field of Classification Search .............. 439/630, 439/159, 326, 912, 741
See application file for complete search history.

(56) References Cited

U.S. PATENT DOCUMENTS 7,140,899 B2 * 11/2006 Matsunaga ................. 439/326
7,404,727 B1 * 7/2008 Lee et al. .................... 439/326
7,618,273 B1 * 11/2009 Wang et al. ................. 439/159
2005/0245136 A1 * 11/2005 Yin et al. .................... 439/630
2007/0093137 A1 * 4/2007 Zhao et al. .................. 439/630
2007/0117463 A1 * 5/2007 Washino et al. ............. 439/630

FOREIGN PATENT DOCUMENTS

CN 2710202 Y 7/2005

\* cited by examiner

*Primary Examiner*—Jean F Duverne
(74) *Attorney, Agent, or Firm*—Andrew C. Cheng; Wei Te Chung; Ming Chieh Chang

(57) ABSTRACT

An electrical connector includes an insulating housing. The insulating housing includes a base having a top surface, a bottom surface opposite to the top surface and a plurality of sidewalls having a top surface high than the top surface of the base. The top surface of the base and the sidewalls commonly form a first receiving room. The base defines a second receiving room of a notch shape running through the top and bottom surface of the base and a first sidewall of said sidewalls. A row of passageways is located in the base and far away from the first sidewall. The first sidewall adjacent to the second receiving room is defined as two opposite stopping walls.

5 Claims, 5 Drawing Sheets ically, an object of the present invention is to provide

ELELCTRICAL CONNECTOR WITH NOTCH FOR RECEIVING MATING COMPONET

BACKGROUND OF THE INVENTION

1. Field of the Invention

The present invention relates to an electrical connector for receiving card-like components or similar module therein.

2. Description of the Related Art

Conventional electrical connectors are widely used in electronic devices to establish electrical connection between two electrical elements and are facility to replacement. As shown in FIG. 5, an electrical connector is soldered on a circuit board by surface mounting technology (SMT). The connector includes a bottom 20 and a cover 30 rotatably assembled one side of the bottom. The cover has two side walls of L-shaped cross section, extending therefrom for defining a receiving room and a mating component such as card-like member is inserted into the receiving room therefore. The cover loaded with the mating component rotates towards the bottom and then the mating component contacts with the conductive terminals 201 arranged on the bottom. The connector occupies a not-small area on a printed circuit board on which the connector is mounted.

In view of the above, a new electrical connector that overcomes the above-mentioned disadvantages is desired.

SUMMARY OF THE INVENTION

Accordingly, an object of the present invention is to provide an electrical connector which can make a full usage of space therearound such as a printed circuit board where the connector is mounted.

To fulfill the above-mentioned object, an electrical connector comprises an insulating housing. The insulating housing comprises a base having a top surface, a bottom surface opposite to the top surface and a plurality of sidewalls having a top surface high than the top surface of the base. The top surface of the base and the sidewalls commonly form a first receiving room. The base defines a second receiving room of a notch shape running through the top and bottom surface of the base and a first sidewall of said sidewalls. A row of passageways is located in the base and far away from the first sidewall. The first sidewall adjacent to the second receiving room is defined as two opposite stopping walls.

Other objects, advantages and novel features of the invention will become more apparent from the following detailed description when taken in conjunction with the accompanying drawings.

DETAILED DESCRIPTION OF THE PREFERRED EMBODIMENT OF THE INVENTION

Reference will now be made to the drawings to describe the present invention in detail.

Figure 1:
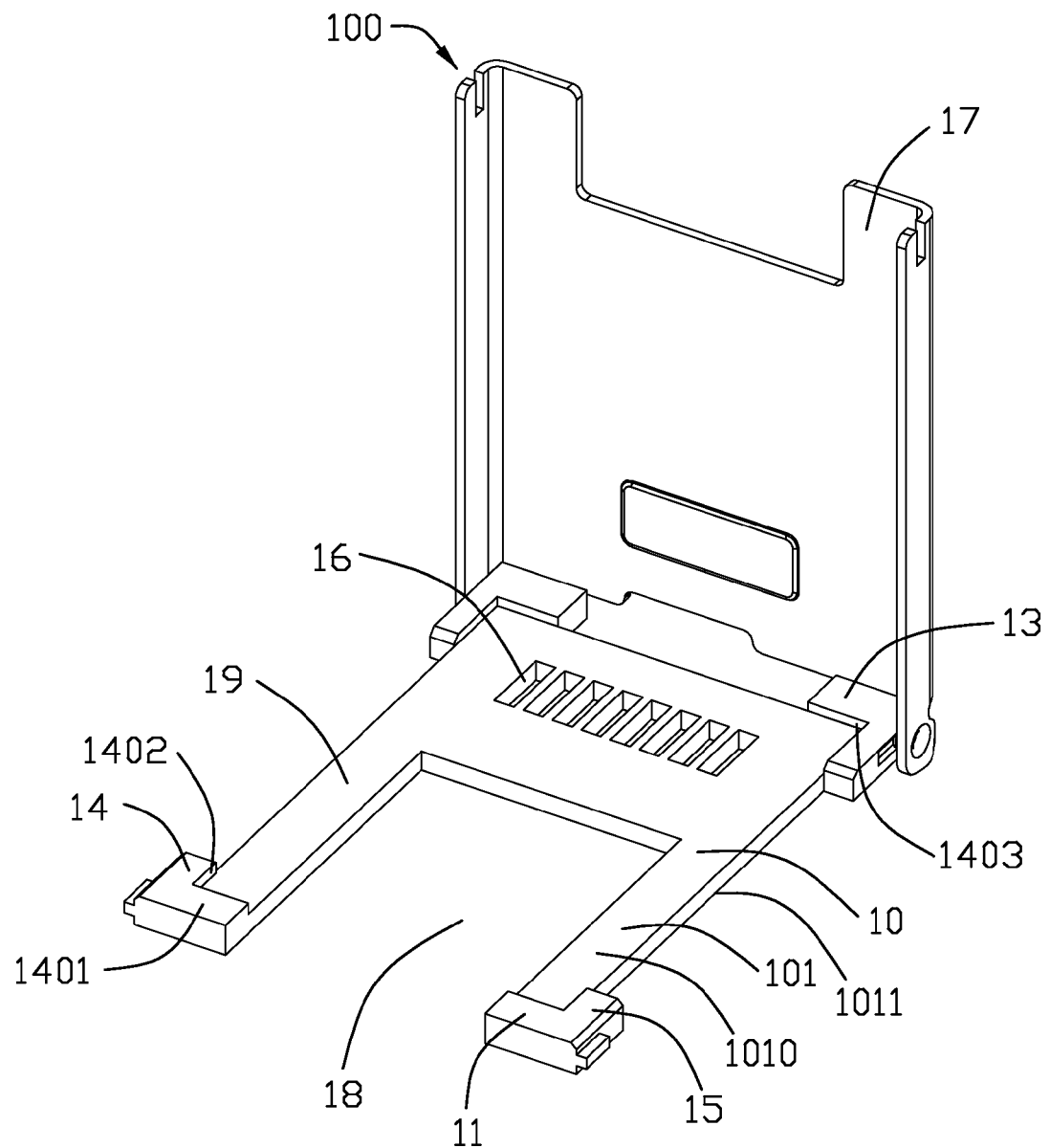
FIG. 1 is a perspective view of an electrical connector in accordance with a preferred embodiment of the present invention.
Figure 2:
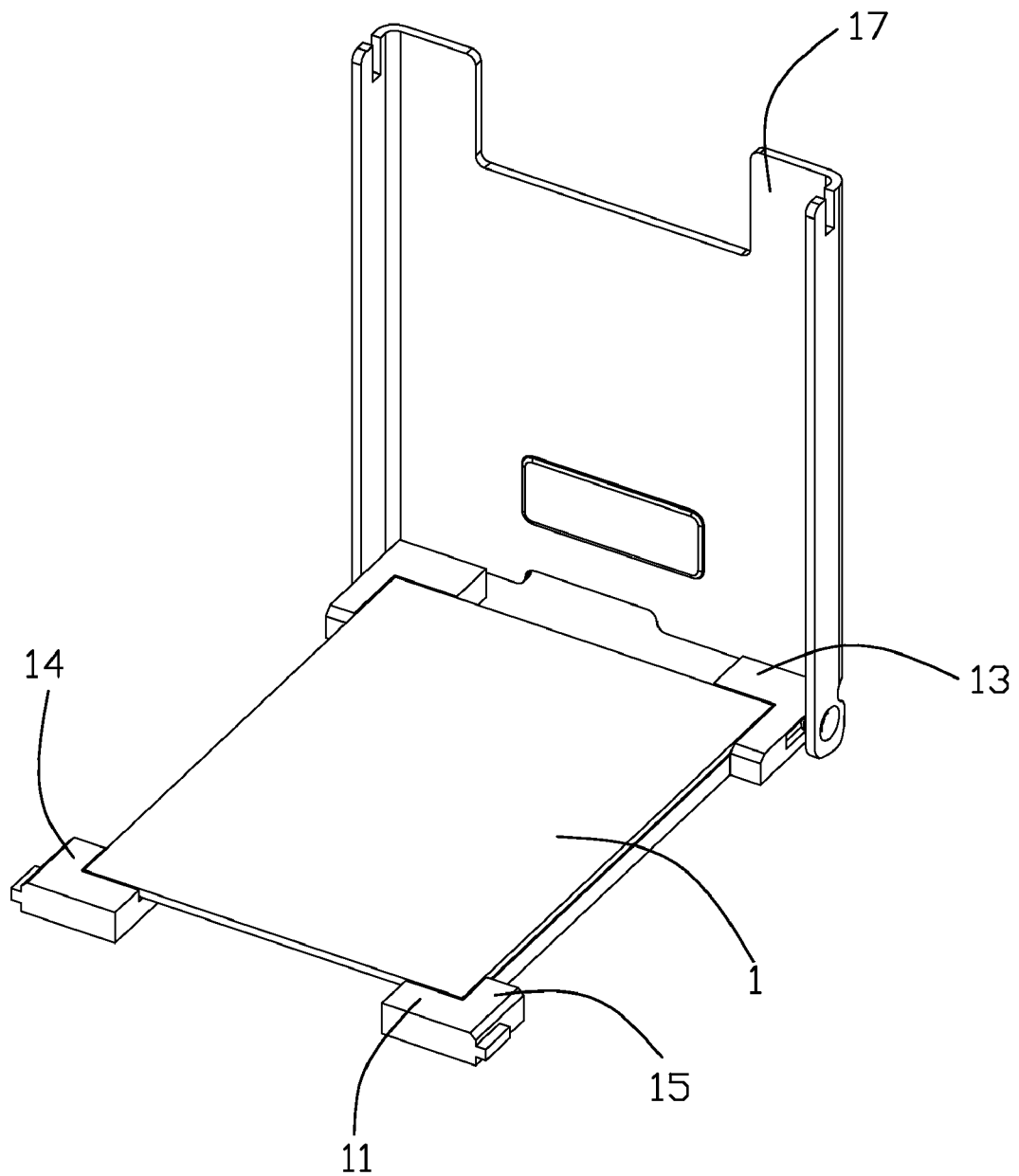
FIG. 2 is an isometric view of the electrical connector receiving a mating component therein.
Figure 3:
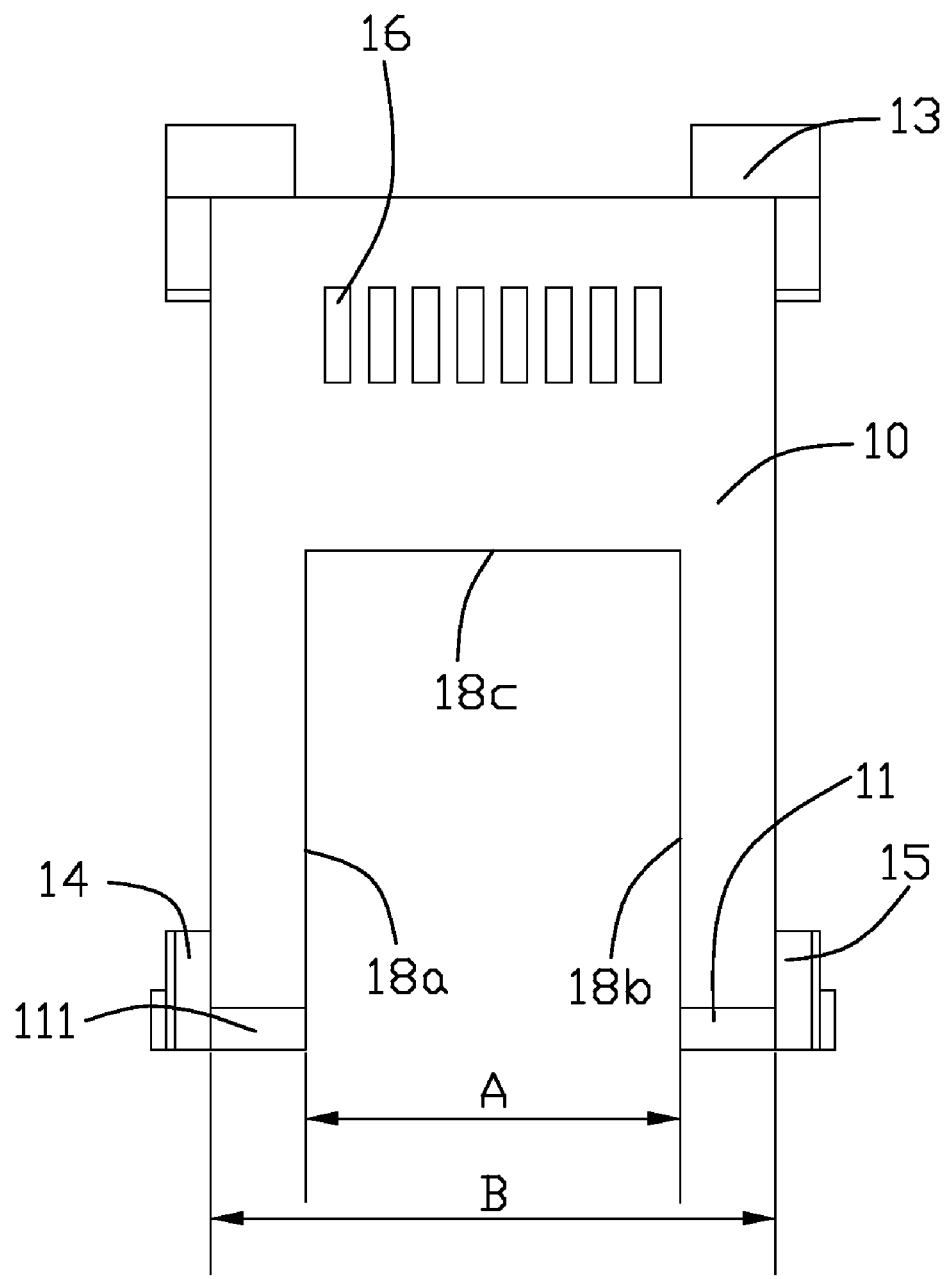
FIG. 3 is a top plan view of insulating housing of the connector.

Referring to FIGS. 1-3, an electrical connector 100 in accordance with the present invention, comprises an insulating housing 10 and a cover 17 loaded on the housing 10. The insulating housing 1 comprises a base 101 configured with a planar top face 1010 and sidewalls unitary extending upwards from the base 101.

The sidewalls includes a first sidewall 11, a second sidewall 13 opposite to the first sidewall, a third sidewall 14 connecting with one ends of the first and second sidewalls 11, 13, and a firth sidewall 15 opposite the third sidewall 14 and connecting with another ends of the first and second sidewalls. The four sidewalls have a common plane top surface 1401 which is higher than the plane top surface 1010 of the base 101 and therefore a first receiving room 19 is defined among the top surface 1010 of the base and inside surfaces 1402 of the sidewalls. The four sidewalls define four right corners 1403. The four sidewalls are discontinuous and separate in middle to form said four corners 1403.

The cover 17 connects with the second sidewall 13 by a manner of pivoting assembling. The base defines a plurality of passageways 16 adjacent to the second sidewall 13 and arranged along a direction from the third sidewall 14 to the forth sidewall 15 to receive correspond terminals (not labeled).

The base 101 further defines a second receiving room 18 of rectangular notch shape, which runs through an outer surface or a front surface of the first sidewall 11. The second receiving room 18 defines three inside surface 18a, 18b, 18c of linear from a top plan view as best shown in FIG. 3, wherein the first and second inside surfaces 18a, 18b are parallel and opposite to each other. The first and second inside surfaces 18a, 18b intersects the first sidewall 11 and base 101 with a manner of parallel to the third and forth sidewalls 14, 15. The third inside surface 18c joins at one ends of the first and second inside surface 18a, 18b and perpendicular to the first and second inside surfaces. The third inside surface 18c is parallel to the second sidewall 13 and the passageways 16 are arranged on the base between the third inside surface 18c and the second sidewall 13. The second receiving room runs through the top surface 1010 and a bottom surface 1011 opposite to the top face.

The transverse distance B of the first receiving room 19 is larger than that of the second receiving room 18 and then the reminder of first sidewall 11 is defined as two stopping walls 111. The second receiving room 18 in the form of notch occupies more than one half of the whole base and a small area of the base leaves to load the terminals.

Figure 4:
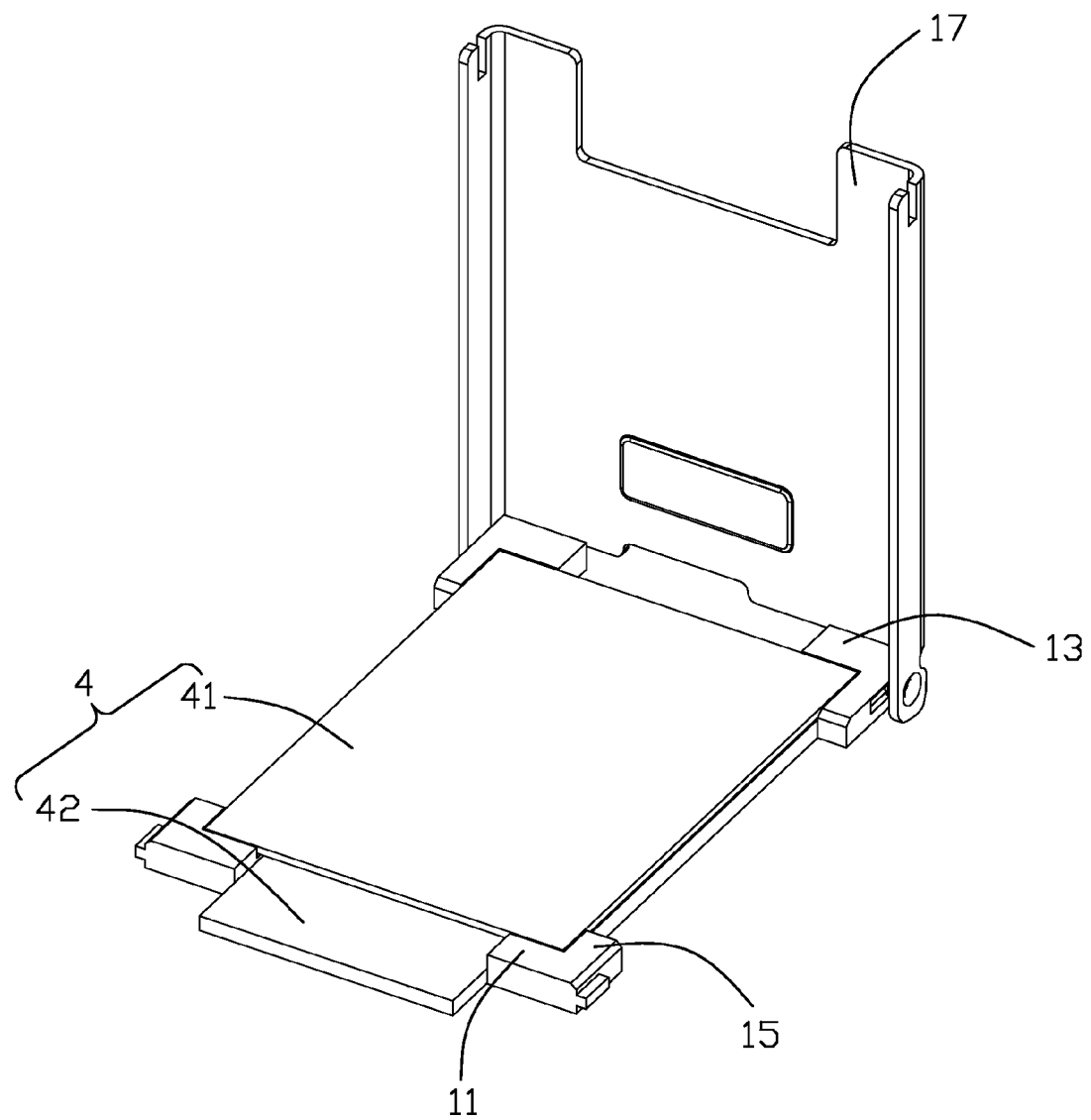
FIG. 4 is an isometric view of the electrical connector receiving another mating component therein.
Figure 5:
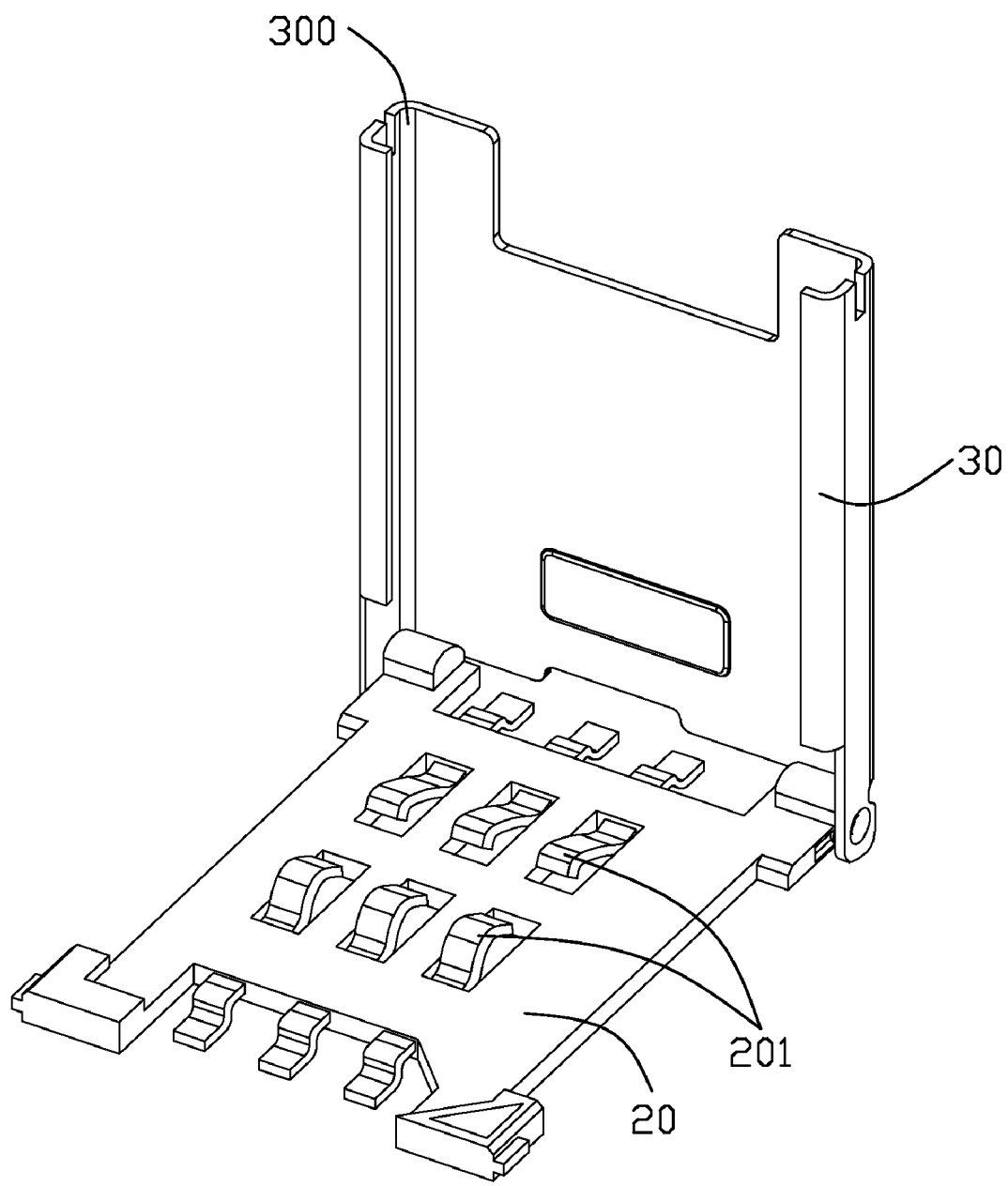
FIG. 5 is a perspective view of a conventional electrical connector.

As best shown in FIG. 2, a mating component 1 such as card-like component is push into the first receiving room 19, supported by the base 101 and four sidewalls, particularly the stopping walls 111 prevent the mating component 1 from escaping from the first receiving room 19. The second room 18 below the mating component is used for communicating with electronic components moveably or immovably on a printed circuit board on which the connector is mounted. As shown in FIG. 4, the connector 100 can also receive another mating component 4, which has a top portion 41 and a lower portion 42 attached on the lower face of the top portion. The top portion 41 is received in the first receiving room 19 and the lower portion 42 is received in the second receiving room 18. The first and second inside surface 18a, 18b are used to limit the second portion 42 in the transverse direction. The second mating component can be an optical transmitting modular.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector comprising:
   an insulating housing comprising a base having a top surface, a bottom surface opposite to the top surface and a plurality of sidewalls having a top surface high than the top surface of the base, the top surface of the base and the sidewalls commonly forming a first receiving room;
   the base defining a second receiving room of a notch shape running through the top and bottom face of the base and a first sidewall of said sidewalls;
   a row of passageways located in the base and far away from the first sidewall;
   the first sidewall adjacent to the second receiving room being defined as two opposite stopping walls; wherein the first and second receiving room are used to receive a mating component in the first receiving room or receive another mating component in the first and second receiving room at a same time; wherein said another mating component is an optical transmitting module; comprising a cover rotatably assembled on a second sidewall of the housing opposite to the first sidewall; wherein the sidewall further comprises a third and a forth sidewalls connecting with the first and second sidewalls, and said four sidewall forms four right corners.

2. The electrical connector as claimed in claim 1, wherein a transverse distance of the first receiving room is larger than that of the second receiving room along a first sidewall extending direction.

3. An electrical connector assembly comprising:
   an insulative housing defining a base with opposite front and rear end regions along a front-to-back direction, and with a plurality of side walls upwardly extending therefrom, said side walls being arranged in an interrupted manner with one another with regard to a circumference of said base;
   the base cooperating with the side walls commonly defining an upper receiving room; and
   a notch defined in the front region of the base to form a lower receiving room under the upper receiving room, said lower receiving room being smaller than the upper receiving room in both the front-to-back direction and a transverse direction perpendicular to said front-to-back direction; wherein
   no portions of said contacts are located in the lower receiving room so as to allow an optical transmitting module, which has an upper portion and a lower portion thereof, to be snugly received respectively in the upper receiving room and the lower receiving room under condition that the lower portion extends forwardly beyond the upper portion; wherein a cover is pivotally mounted to the rear region of the base and moveable between open and closed positions, and is configured to only downward retain the optical transmitting module in a vertical direction perpendicular to both said front-to-back direction and said transverse direction when said cover is located in the closed position but not to associatively hold the optical transmitting module during assembling the optical transmitting module to the housing when said cover is located in the open position so that the optical transmitting module can be independently assembled to the housing with assistance of said cover.

4. The electrical connector assembly as claimed in claim 3, wherein said cover defines a pair of side arms protectively laterally shielding both the base and the side walls thereon and further the optical transmitting module.

5. The electrical connector assembly as claimed in claim 4, wherein said cover defines a notch in a front portion, corresponding to the optical transmitting module, in the vertical direction when said cover is located in the closed position and the optical transmitting module is assembled to the housing.

* * * * *